Patented Jan. 8, 1952

2,581,493

UNITED STATES PATENT OFFICE 2,581,493

PURIFICATION OF MERCAPTANS

Joseph P. Lyon, Jr., and Arthur A. Harban, Phillips, Tex., assignors to Phillips Petroleum Company, a corporation of Delaware No Drawing. Application October 1, 1945, Serial No. 619,704

10 Claims. (Cl. 260—609)

This invention relates to the recovery of mercaptans and particularly to the separation of mercaptans from associated hydrocarbons and other impurities. More particularly, this invention relates to the purification of tertiary aliphatic mercaptans from petroleum sources.

In recent years many new and valuable applications have been developed for aliphatic mercaptans, especially those in the higher molecular weight categories. The heavier mercaptans are particularly in demand as synthetic rubber modifiers and as intermediates in the manufacture of lubricating oil additives, resin and rubber plasticizers, detergents and the like. Petroleum refining processes by virtue of their vast supply of olefin stocks derived from cracking and related operations are in a favorable economic position as regards the manufacture of aliphatic mercaptans. Isomeric olefins of selected boiling range are subjected to reaction with hydrogen sulfide either with or without the presence of catalysts to prepare the aliphatic mercaptans, catalyst generally being preferred.

A co-pending application of Walter A. Schulze, Serial Number 493,466, filed July 3, 1943, now Patent No. 2,392,555, describes a process for the production of high-boiling mercaptans predominantly composed of tertiary mercaptans by reacting hydrogen sulfide with corresponding isomerized olefins. Due to the branched nature of such olefins, mercaptans thus prepared are virtually exclusively tertiary in configuration. Since in only very few instances is it feasible to operate with a single olefin, isomeric mixtures of restricted boiling range are employed. The crude mercaptan products are invariably associated with unreacted and polymerized olefins of similar boiling range. The extent of such contamination becomes progressively more serious as the molecular weights of the mercaptans increase. The accompanying table presents pertinent data on some commercially available tertiary aliphatic mercaptans.

TABLE

*Properties of commercial tertiary aliphatic mercaptans*

| t—RSH | $C_4$ | $C_5$ | $C_8$ | $C_{12}$ | $C_{14}$ | $C_{16}$ |
|---|---|---|---|---|---|---|
| Distillation Range, °F | 136–159 | 204–217 | 301–333 | [1] 172–207 | [1] 218–252 | [1] 247–314 |
| Molecular Weight | | 105 | 145 | 193 | 230 | 259 |
| Sp. Gr. 60/60 | 0.790 | 0.8117 | 0.856 | 0.8713 | 0.877 | 0.879 |
| RSH Sulfur, Wt. Per Cent [2] | 32.1 | 25.9 | 21.6 | 15.9 | 11.9 | 6.1 |
| RSH Content, Wt. Per Cent | 90.3 | 85.4 | 97 | 96.8 | 85.6 | 49.5 |

[1] Distillation range at 5 mm. pressure.
[2] Rubber Reserve Test Method L. M. 2.5.7.

From the preceding table it is apparent that an auxiliary purification method is required in order to prepare high-purity products. This is especially true in cases where the carbon content of the mercaptans exceeds twelve atoms per molecule. Due to the low volatility of the heavier mercaptans, they must be recovered at reduced pressures over a broader boiling range and are obtained less pure. Thus while by the employment of precise vacuum fractional distillation satisfactory mercaptan concentrates may often be prepared for compounds up to eight or twelve carbon atoms, those mercaptans having more carbon atoms per molecule are not amenable to such treatment. For many of the uses to which the heavier tertiary mercaptans may be applied, it is essential that more highly purified compounds be available. However, in practically no case can a substantially hydrocarbon-free product be obtained by present economically feasible distillation procedures.

It is therefore an object of this invention to provide a process for the purification of mercaptans.

Another object is to provide for the purification of mercaptans by a chemical process.

A further object is to provide for the purification of mercaptans by the formation of crystalline mercaptides.

Still another object is to provide a process for the purification of mercaptans which includes the formation of solid crystalline mercaptides, separation of non-mercaptide material and regeneration of purified mercaptans.

Other objects will be apparent from the discussion of the invention hereinafter.

In general the present invention proposes the purification of mercaptans by forming crystalline mercaptide salts, washing the salts free of hydrocarbon and other impurities and regenerating the mercaptans from the purified mercaptide salts. In a preferred embodiment crude mercaptan-containing solution is mixed with a solution of a soluble cadmium salt, such as cadmium acetate, and the cadmium mercaptide which precipitates is filtered, washed and dried. The dried and purified mercaptide is suspended or dissolved in a suitable solvent and subjected to hydrolysis with an inorganic acid.

For the successful application of this method to the purification of mercaptans, the metal mercaptide should be crystalline and easily converted to the mercaptan which, of course, should preferably undergo no change during the purification process. The formation of a crystalline mercaptide is essential in order that non-mercaptan oils and other impurities may be easily removed. For economic reasons it is preferable for the efficient recovery of the desired mercaptans that the mercaptide be easily hydrolyzed.

Many metal salts, such as those of lead, mercury, copper, silver, gold, zinc, iron, cobalt, tin and cadmium under proper conditions form crystalline salts. Most of the mercaptide salts of these metals however are very unstable and oxidize very rapidly and some of these mercaptide salts are gummy non-crystalline masses. Others give suitable crystalline salts for some mercaptans and unsatisfactory forms of mercaptides for other mercaptans in a series. Lead mercaptide particularly oxidizes to the disulfide or forms complex, relatively stable peroxides even in the presence of air. The mercaptide salts of mercury, copper, silver, iron, cobalt and tin also readily oxidize to the disulfide and resist hydrolysis. The conversion and/or oxidation rate is in some degree dependent upon the configuration of the organic radical, those of tertiary generally being less reactive but still oxidizing with comparative ease.

We have discovered that zinc and cadmium salts by reaction with mercaptans form crystalline, stable mercaptides which can be decomposed to form pure mercaptans, and therefore these metal cations are particularly suited for use in preparation of pure mercaptans in accordance with our invention. Of the two metals, cadmium is preferred since it forms a somewhat more readily separable precipitate and affords recovery of the mercaptans in better yield, although either zinc or cadmium may be satisfactorily utilized. Furthermore the reaction resulting in formation of the mercaptides goes substantially to completion so that the recovery of purified mercaptans from the crude solution is very high. Readily ionizable metal salts of the lower weaker organic acids, such as the acetates, propionates, and butyrates are particularly useful as a source of the desired metallic cation. A suitably reactive cadmium salt to react with the mercaptans in forming crystalline cadmium mercaptide was found to be cadmium acetate dihydrate dissolved in a methanol-acetone mixture, this mixture being a common solvent for both the mercaptans and the reactive cadmium salt and precipitating the cadmium mercaptide when cool. A fractionated sample of aliphatic mercaptan is dissolved in acetone or an acetone-methanol mixture and cooled to about 40° F. A solution of cadmium acetate dihydrate in methanol-acetone is added to the mercaptan solution with agitation. The crystalline precipitate of cadmium mercaptide is filtered and washed with acetone to free the mercaptide of adsorbed hydrocarbon. The dry filter cake is powdered and suspended in water in the presence of a wetting agent or dissolved in light volatile hydrocarbon such as pentane. After the powder is completely wetted or dissolved, acid such as hydrochloric acid is added and the mixture is heated to boiling while maintaining constant agitation. Hydrolysis is complete when the particles of solid mercaptide have disappeared or the hydrocarbon layer has become clear. The hydrolysis step ordinarily is complete in about one hour. The mercaptan layer is separated, washed free of acid and dried over anhydrous calcium sulfate or the hydrocarbon solution is washed and dried before distillative recovery of the hydrocarbon solvent. The use of the volatile hydrocarbon in the hydrolysis step is particularly advantageous with mercaptans having 14 or more carbon atoms. Substantially quantitative yields of highly purified mercaptans may be obtained in this manner.

The invention may be better understood by the following examples, showing the practical benefits to be derived from applications of the invention. The examples are illustrative only and are not intended to limit the scope of the invention.

EXAMPLE I 100 cc. of a fractionated sample of tertiary butyl mercaptan corresponding in purity and physical constants to the data given in the table, that is, containing about 90 per cent mercaptan and boiling from about 136 to 159° F., was dissolved in 500 cc. of acetone. 120 grams of cadmium acetate dihydrate dissolved in 900 cc. of methanol was slowly added to the mercaptan solution at room temperature to yield a white granular precipitate of the cadmium tertiary butyl mercaptide. The precipitate was collected on a filter, thoroughly washed with acetone and dried. The resulting dry cake was broken up and suspended in 500 cc. of water in the presence of a wetting agent such as about 0.1 gram of "Aerosol MA" which is a sulfonated ester of a bicarboxylic acid and which alters the surface tension properties of the mercaptide so that it is more readily wetted by the water. 50 cc. of concentrated hydrochloric acid was added to the suspension which was then heated to boiling temperature. At the conclusion of one hour of boiling, hydrolysis was complete. The mercaptan which separates as a layer over the acidic layer is separated and dried. The dried mercaptan was found to have a purity of 98.5 per cent as compared with 90.3 per cent for the original commercial concentrate.

EXAMPLE II

A solution of 100 cc. of the tertiary $C_{14}$ mercaptan of 85.6 per cent purity as described in the table in 500 cc. of acetone was cooled to 40° F., and a solution of 50 grams of cadmium acetate dihydrate dissolved in a mixture of 250 cc. of methanol and 500 cc. of acetone was slowly added to the mercaptan solution with vigorous stirring. The white granular precipitate of cadmium tertiary tetradecyl mercaptide was collected on a filter and then suspended in 300 cc. of cold acetone to wash the mercaptide free of adsorbed hydrocarbon. After final filtration of the washed mercaptide, it was powdered and suspended by mechanical stirring in 250 cc. of water containing 0.1 gram of "Aerosol MA," described in Example I, to insure thorough wetting of the powder. 25 cc. of concentrated hydrochloric acid was added and the agitated mixture was refluxed until no particles of unhydrolyzed cadmium mercaptide remained. The oily layer was separated, washed and neutralized with water and sodium carbonate solution and dried over anhydrous calcium sulfate to yield a product having a purity of 97.5 per cent as compared with a value of 85.6 percent for the original commercial product. The recovery of tetradecyl mercaptan was 89.3 weight per cent of the original.

EXAMPLE III 200 cc. of the commercial tertiary hexadecyl mercaptan, described in the table, of only 49.5 per cent purity was added to 2000 cc. of a 1:1 methanol-acetone solution. This solution was cooled to 40–45° F. and a similarly cooled solution of 50 grams of cadmium acetate dihydrate in 350 cc. of methanol was added slowly with mechanical stirring to the mercaptan solution. The resulting precipitate of cadmium tertiary hexadecyl mercaptide was freed of adsorbed hydrocarbons as described in Example II. The dry powdery mercaptide was then dissolved in n-pentane which in turn was treated with hydrochloric acid while maintaining good dispersion between the aqueous and non-aqueous phases. The hydrolysis was complete when the pentane layer became clear. The pentane-mercaptan solution was washed with water and dilute sodium carbonate after which the solution was dried by percolation over anhydrous calcium sulfate. The pentane solvent was separated from the mercaptan by a flash distillation to yield a mercaptan product of 85 per cent purity, an increase in purity of 35.5 per cent over the original concentrate of 49.5 per cent purity. In this operation the mercaptan of 85 per cent purity was obtained in a yield of 70.3 per cent.

The process was repeated, dissolving the 85 per cent mercaptan product from the first step, precipitating the cadmium mercaptide, purifying and recovering a final mercaptan product of 95 per cent purity in a 91.5 per cent yield. Thus a product of 95 per cent mercaptan was obtained from an original sample of 49.5 per cent purity by the process of forming crystalline metal mercaptides, purifying crystalline salts, and hydrolyzing to recover the mercaptan.

Dissolution and recrystallization may be employed in place of or in addition to the purifying washes of the crystalline precipitate as desired. Also, further concentration of the purified mercaptan may be obtained by fractionation of the final mercaptan yield. Although the examples have been confined to the description of the process in the purification of tertiary mercaptans as presently more desirable compounds, the process is equally effective in the purification of other types of mercaptans. These and other modifications familiar to one skilled in the art may be introduced without departing from the spirit of the invention as disclosed and claimed.

We claim:

1. A process for the recovery of pure tertiary alkyl mercaptans from an impure mixture containing the same, which comprises treating said mixture at a temperature of about 40° F. with a soluble readily ionizable lower organic acid salt of a metal from the group consisting of cadmium and zinc, precipitating and recovering resulting crystalline metallic mercaptides, washing said crystalline mercaptides to dissolve and separate impurities therefrom, dispersing said mercaptides in a solvent and an inorganic acid, boiling the resulting dispersion to hydrolyze said mercaptides, and separately recovering said pure mercaptans.

2. A process according to claim 1 in which said mercaptans comprise tertiary alkyl mercaptans having four or more carbon atoms.

3. A process according to claim 1 in which said mercaptans comprise tertiary alkyl mercaptans having ten to twenty carbon atoms.

4. A process for the purification of aliphatic mercaptans from an impure mixture containing the same which comprises treating said mercaptans with a soluble cadmium salt of a lower organic acid at a temperature of about 40° F., precipitating and recovering crystalline cadmium mercaptide, washing said mercaptide thereby separating impurities from said mercaptide, dispersing said mercaptide in a solvent, boiling and hydrolyzing said mercaptide salt with an inorganic acid to recover said purified, mercaptans.

5. A process according to claim 4 in which said mercaptans comprise tertiary mercaptans having four or more carbon atoms.

6. A process for the purification of aliphatic mercaptans from an impure mixture containing the same which comprises treating said mixture with cadmium acetate dihydrate in a mutual solvent at a temperature of about 40° F., washing and purifying a resulting precipitated crystalline cadmium mercaptide with portions of acetone, suspending said purified mercaptide in water and a wetting agent, acidifying the mixture and hydrolyzing said mercaptide in the presence of an inorganic acid while boiling the mixture, and recovering the purified mercaptans.

7. A process for the purification of aliphatic mercaptans from an impure mixture containing the same which comprises treating said mercaptans with a soluble zinc salt of a lower organic acid at a temperature of about 40° F., precipitating and recovering resulting crystalline zinc mercaptide, washing said zinc mercaptide crystals thereby separating impurities from said mercaptide, boiling and hydrolyzing the mercaptide salt with an inorganic acid to recover said mercaptans.

8. A process according to claim 7 in which said mercaptans comprise tertiary alkyl mercaptans having four or more carbon atoms.

9. A process for the recovery of pure aliphatic mercaptans from an impure mixture containing the same which comprises treating said mixture at a temperature of about 40° F. with a soluble readily ionizable lower organic acid salt of a metal from the group consisting of cadmium and zinc, precipitating and recovering resulting crystalline metallic mercaptides, washing said crystalline mercaptide to dissolve and separate impurities therefrom, boiling said mercaptide in the presence of a solvent and an inorganic acid to hydrolyze said mercaptide and to re-form said mercaptans, and separately recovering said pure mercaptans.

10. A process for the purification of a tertiary aliphatic mercaptan having fourteen carbon atoms from a mercaptan-containing hydrocarbon mixture which comprises reacting said mercaptan contained in said mixture with cadmium acetate dihydrate in acetone at a temperature of about 40° F., washing and purifying a resulting precipitated crytalline cadmium mercaptide with acetone thereby separating impurities from said mercaptide, suspending said mercaptide in water and a wetting agent, acidifying the mixture with hydrochloric acid to thereby hydrolyze said mercaptide to a free mercaptan.

JOSEPH P. LYON, Jr.
ARTHUR A. HARBAN.

REFERENCES CITED

The following references are of record in the file of this patent:

UNITED STATES PATENTS

| Number | Name | Date |
|---|---|---|
| 1,696,377 | Black | Dec. 25, 1928 |
| 2,229,528 | Shoemaker | Jan. 21, 1941 |
| 2,356,661 | Downing | Aug. 22, 1944 |
| 2,362,052 | Craig | Nov. 7, 1944 |
| 2,364,416 | Ayers | Dec. 5, 1944 |
| 2,382,700 | Eby | Aug. 14, 1945 |
| 2,416,440 | Fryling | Feb. 25, 1947 |

FOREIGN PATENTS

| Number | Country | Date |
|---|---|---|
| 542,141 | Great Britain | Dec. 29, 1941 |

OTHER REFERENCES

Wertheim: "Jour. Am. Chem. Soc.," vol. 51 (1929), pages 3661–4.

Reinboldt: "Jour. Prakt Chim.," vol. 134 (1932), page 269.